Patented Jan. 6, 1942

2,269,125

UNITED STATES PATENT OFFICE 2,269,125

METHOD OF MAKING LAMINATED FABRICS

Charles C. Quenelle and Cornelius F. Turner, Newburgh, N. Y., assignors to E. I. du Pont de Nemours & Company, Wilmington, Del., a corporation of Delaware No Drawing. Application February 23, 1940, Serial No. 320,422

7 Claims. (Cl. 154—2)

This invention relates to a method of preparing laminated fabrics from sheet materials, such as cloth, by means of a polyamide and more particularly to a method of treating the polyamide so that the fabric plies may be joined by means of heat and pressure.

The synthetic linear polyamides described in U. S. Patents 2,071,050, 2,071,253, 2,130,523 and 2,130,948, particularly the simple types, that is, those derived from a single diamine and a single dibasic carboxylic acid or from a single amino acid are characterized by high fusion temperatures, pronounced crystallinity and an insolubility in most solvents except mineral acids, formic acid and phenols.

A number of more soluble and more flexible polyamides are known. Such polyamides include those prepared from laterally substituted components such as beta-methyladipic acid, and four component interpolyamides such as those prepared from two different diamines and two different dibasic acids, as well as those interpolymers comprising the reaction products of a diamine, a dicarboxylic acid and amino acids or derivatives of amino acids. Moreover, while possessing a wider range of solubility than the simple polyamides, such substituted polyamides and four component interpolyamides are still generally insoluble in the more common organic solvents, and are known to be soluble only in phenols, mineral acids, formic and acetic acid, unsaturated alcohols, hot butanol and mixtures of alcohol with chlorinated hydrocarbons. The property of insolubility in common organic solvents renders it difficult to use the polyamides for bonding separate laminae where the use of volatile non-toxic solvents is desirable for activating the latent adhesive property of the polyamide.

It is, therefore, an object of this invention to provide a method of activating the latent adhesive property of interpolyamides by means of treatment with a volatile, non-inflammable and non-toxic liquid.

Another object is the provision of a simple and inexpensive method of rendering normally nontacky interpolyamides sufficiently tacky and cementitious to be used as an adhesive or bonding material.

A further object is to prepare a composite assembly in which the separate laminae are firmly bonded together to give a structure which has a high thermal stability, strength, durability and resistance to moisture and laundering.

Other objects will appear hereinafter.

The objects of this invention are accomplished by employing a particular type of polyamide; namely, an interpolyamide of the kind described below, in the form of a fabric, a precast film or as a coating applied to a base material as the bonding agent, and activating the latent adhesive properties of the interpolyamide by treatment with water under the influences of heat and pressure.

The polyamides most useful as laminating agents are those having an intrinsic viscosity above 0.4 where intrinsic viscosity is defined as in U. S. Patent 2,130,948. In general the strength and toughness of a polyamide increases with the intrinsic viscosity, polyamides having intrinsic viscosities between 0.6 and 2.0 being particularly useful for the purposes of the present invention.

Polyamides particularly applicable to this invention, because of the relatively low melting points, are the polyamide interpolymers derived from mixtures of polyamide-forming reactants, as for instance polyamide derived from mixtures of diamines, amino acids, and dibasic acids. For the lamination of fabrics interpolyamides are of particular value which possess melting points in the appropriate range; namely, 125° F. to 390° F., and which have high strength and flexibility. Of these interpolyamides those prepared with the use of a substantial amount, preferably 30% to 70% by weight, of 6-aminocaproic acid or one of its amide-forming derivatives, are most useful.

In copending application S. N. 301,044, filed October 24, 1939, by F. T. Peters, there is disclosed and claimed the lamination of flexible sheet materials by means of polyamides and interpolyamides. It has now been discovered that the adhesiveness of an interpolyamide under the influence of heat and pressure is greatly increased if the interpolyamide is treated with water before subjecting it to the influence of heat and pressure. By increasing the adhesiveness of the interpolyamide by treatment with water, less interpolyamide and less heat are required for satisfactory lamination than are required without the use of water. In the case of the lamination of cotton textiles with an interpolyamide not previously treated with an activator, a fusing temperature near the melting point of the interpolyamide is required which generally approximates the temperature at which cotton fabric will be scorched if the contact with the heating element is for a period of approximately 30 seconds. It is not considered safe to subject cotton fabrics to a temperature as high as 350° F. for a period of 30 seconds or longer since the cotton fabric will be scorched under these conditions. The present invention provides a method for fusing cotton fabrics by means of interpolyamides without the aid of toxic solvents and under conditions which will not scorch cotton fabrics.

The following examples set forth the preferred embodiment for the purpose of illustration and not limitation.

*Example I*

Cotton sheeting fabric was coated with an aqueous colloidal suspension containing 8% of a finely divided interpolyamide prepared by the co-polymerization of 6 parts of hexamethylene diammonium adipate and 4 parts of caprolactam, the polymer having an intrinsic viscosity of 1.0. Five coats of the suspension were applied on each side of the fabric. The total dry weight of coating applied by this method was approximately 3.5 ounces per 38" yard. The coated fabric thus prepared was used as an interliner and was fused between two plies of cotton broadcloth which had previously been moistened with water. The assembly of broadcloth plies and the interliner were fused by subjecting to a pressure of approximately 40 lbs. per square inch at 320° F. for 5–10 seconds. The laminated fabric assembly was firmly bonded together and had a degree of stiffness which made it particularly suitable for use in fabricating semi-stiff collars, cuffs, etc. The laminated fabric was very resistant to laundering or dry cleaning agents. Should there be any separation of plies during the laundering of the laminated fabrics the bond is again realized by ironing the moistened laminated fabrics with a medium hot iron as commonly employed in a home.

*Example II*

A dry film .015" thick of the interpolyamide described in Example I, was immersed in water until it absorbed approximately 10.0% water. The water containing film of the interpolyamide was placed between two plies of cotton broadcloth running 4 yards per pound per 37" width. The two broadcloth plies with the film as an interlayer were fused together by pressing between a heated platen (300° F.) and a supporting bed. The duration of heat and pressure treatment was thirty seconds. After the application of the heat and pressure treatment the three separate plies were firmly fused together. The bond was not broken when the assembly was boiled in a 1% soap solution for 5 minutes.

*Example III*

A dry film .015" thick of the interpolyamide described in Example I was immersed in water until it absorbed water to the extent of approximately 5.0% of its weight. The wet film was fused between two cotton broadcloth plies in accordance with the procedure given in Example II. The separate laminae were bonded together to form an integral composite assembly, the bond of which was not broken when the assembly was boiled in a 1% soap solution for a period of 5 minutes.

When the same dry film (.015" thick) without the addition of water was placed between two cotton broadcloth plies and subjected for an equal length of time to the same degree of heat and pressure as employed in Examples II and III, only slight adhesion between the broadcloth and interpolyamide was effected.

*Example IV*

A cotton fabric running 4.95 yards per pound per 42" width having a thread count of 64 x 60 was coated with a solution of the interpolyamide described in Example I. Sufficient solution was applied on each side of the fabric to deposit on the fabric 1.6 ounces of the dry interpolyamide per square yard. The coating composition consisted of:

| | Per cent |
|---|---|
| Interpolyamide | 25.0 |
| Ethyl alcohol | 37.5 |
| Water | 15.0 |
| Methyl ester of the monoethyl ether of diethylene glycol | 22.5 |

After the volatile solvents of the solution were removed by passing through a heated chamber, the coated fabric was cut in the form of a conventional collar ply. Two plies of cotton broadcloth were also cut in the form of a collar ply. The coated fabric was immersed in water until it absorbed water to the extent of 4.0% of its weight. Once this amount of water was absorbed it did not readily evaporate at ordinary room temperature. The coated fabric containing 4.0% moisture was placed on top of the two broadcloth plies, and a row of stitching was then applied on all the edges of the collar except on the edge which is subsequently attached to the neck band. The collar plies were then turned in such a manner that the coated interliner became sandwiched between the two broadcloth plies. Another row of stitching was then applied on the same sides as indicated above. After the stitching was applied, the assembly was subjected to pressure between a metal plate heated to 300° F. and a supporting bed for a period of thirty seconds. The separate laminae became laminated to form a composite assembly. The bond was not broken when the assembly was boiled in a 1% soap solution for 5 minutes.

The adhesiveness of the interpolyamide under the influences of heat and pressure is in proportion to the amount of water present in the interpolyamide. In the case of an interpolyamide film in which the water is less than 4.0% of the weight of the film, satisfactory adhesion is not obtained when fused between cotton cloth. Quantities as high as 15% water in the film are satisfactory for certain uses, in which case it is necessary to use a lower fusing temperature to prevent the interpolyamide from striking through the outer ply fabrics.

In the case of interpolyamide coated fabrics used as the interliner, the amount of water introduced into the coated fabric before the fusing operation will vary over a wider range due to the water absorbed by the fabric in addition to that absorbed by the interpolyamide. For the purpose of illustration and not limitation a light weight coated fabric (0.8 ounce interpolyamide per square yard on each side of the fabric or 1.6 ounces total coating) will absorb a greater quantity of water (35% maximum) than a heavy coated fabric (1.7 ounces interpolyamide per square yard on each side of the fabric or 3.4 ounces total coating). In the case of the heavier coated fabric the maximum amount of water absorbed is 25% based on the weight of the fabric plus coating. In practice it has been found possible to reduce the tendency of the interpolyamide to strike through the outer broadcloth plies where the greater quantities are employed by fusing the assembly at temperatures somewhat less than 300° F.

It is within the purview of this invention to use an interpolyamide in the form of a fabric, containing 4 to 15% water, as the intermediate bonding layer.

Pressures ranging from 100 to 10,000 pounds/square inch and temperatures of 225° to 340° F. are suitable for the preparation of the laminated fabrics described herein. In general, temperatures 25° to 125° F. below the melting point of the polymer are most suitable.

The interlayer in the form of a preformed film, fabric or coated fabric used in the preparation of the laminated articles of this invention need not necessarily consist solely of the interpolyamide. While it is not the preferred embodiment, it is within the scope of the invention to use softening or plasticizing agents in conjunction with the interpolyamide. Suitable plasticizers for the interpolyamide and methods of introduction are disclosed in co-pending application S. N. 301,044, filed October 24, 1939, by F. T. Peters.

As additional examples of interpolyamides useful as interlayer may be mentioned the polymers derived from the following reactants:

6-aminocaproic acid, octamethylenediamine, and adipic acid
6-aminocaproic acid, decamethylenediamine, and adipic acid
6-aminocaproic acid, hexamethylenediamine, and sebacic acid
6-aminocaproic acid, hexamethylenediamine, adipic acid, and omega-hydroxydecanoic acid
Hexamethylenediamine, triethyleneglycoldiamine, and adipic acid
Hexamethylenediamine, triethyleneglycoldiamine, and sebacic acid As defined in U. S. Patent 2,130,948 referred to above, these interpolyamides when hydrolized with hydrochloric acid yield a mixture comprising diamine hydrochloride and a dibasic carboxylic acid.

In place of the above mentioned reactants amide-forming derivatives thereof may also be used. On hydrolysis with hot hydrochloric acid, the interpolyamides yield monomeric amide-forming reactants. Thus, the interpolyamide of Example I yields, on hydrolysis with hydrochloric, hexamethylenediamine hydrochloride, adipic acid and 6-aminocaproic acid hydrochloride.

If desired, other materials may be added to the interpolyamide or to the solution containing the interpolyamide. Such materials include pigments, extenders, fillers, resins, dyes and cellulose derivatives. Frequently it is advantageous to incorporate the modifying agent with the reactants from which the interpolyamide is prepared.

The invention is not to be limited to the lamination of woven cotton fabrics since other sheet materials may also be laminated by the invention herein described, e. g., cotton felt, mixed fibre felt, paper, rayon fabrics, polyamide fabrics, etc.

In the preparation of laminated fabrics, especially in permanently stiff collars, the invention yields a product of markedly improved durability. They do not, as do collars stiffened with certain cellulose derivative or resin compositions, lose their stiffness and resiliency during use, due to degradation of the bonding agent by laundering and other treatments. Should there be any separation of the separate collar plies during the laundering of the laminated fabrics, they will be re-fused by normal hand ironing of the dampened fabric.

A particularly valuable advantage of the laminated fabrics herein described arises from the fact that it is possible to obtain a product of appropriate stiffness without the use of a plasticizer. Some plasticized compositions change in properties during use, due to evaporation or washing out of the plasticizer.

The use of a non-toxic, non-flammable liquid as the activator for the adhesive qualities of the interpolyamide permits large scale production without the use of costly and hazardous solvent recovery equipment.

As many apparently widely different embodiments of this invention may be made without departing from the spirit and scope thereof, it is to be understood that the invention is not to be limited to the preferred embodiments except as defined in the appended claims.

We claim:

1. In the process of laminating a plurality of fabric plies by means of an intermediate film of an interpolyamide, the improvement which comprises introducing 4 to 15% water into the interpolyamide film and thereafter applying heat and pressure, said interpolyamide being one which yields upon hydrolysis with hydrochloric acid a diamine hydrochloride and a dibasic carboxylic acid.

2. In the process of laminating a plurality of fabric plies by means of an intermediate preformed sheet of an interpolyamide, the improvement which comprises introducing 4 to 15% water into said interpolyamide sheet, fusing said interpolyamide between the fabric plies by applying heat and pressure to the material, said interpolyamide being one which yields upon hydrolysis with hydrochloric acid a diamine hydrochloride and a dibasic carboxylic acid.

3. Process of laminating fabric plies by means of an interpolyamide coated fabric, the improvement which comprises introducing 4 to 15% water in said interpolyamide coated fabric to render said interpolyamide cementitious under pressure at a temperature more than 25° C. below its melting point in the dry state, placing the said water containing interpolyamide coated fabric between two fabric plies and subjecting the assembly to heat and pressure, said interpolyamide being one which yields upon hydrolysis with hydrochloric acid a diamine hydrochloride and a dibasic carboxylic acid.

4. The process set forth in claim 1 wherein said interpolyamide is one obtained from an amino-acid, a diamine, and a dibasic acid.

5. The process set forth in claim 1 wherein said interpolyamide is one obtained from 6-aminocaproic acid, hexamethylenediamine, and adipic acid.

6. The process of laminating cloth plies attached for use in the preparation of semi-stiff collars in which a face ply and back ply are joined by means of an interliner containing an interpolyamide, the improvement which comprises wetting the said interpolyamide until it contains from 4 to 15% water, and thereafter applying heat and pressure until the said plies are firmly bonded to the interliner, said interpolyamide being one which yields upon hydrolysis with hydrochloric acid a diamine hydrochloride and a dibasic carboxylic acid.

7. In the process of laminating a plurality of plies by means of an interpolyamide film as an adhesive, the improvement which comprises introducing from about 4 to 15% water into the said polyamide film, and thereafter joining the plies by means of heat and pressure, said interpolyamide being one which yields upon hydrolysis with hydrochloric acid a diamine hydrochloride and a dibasic carboxylic acid.

CHARLES C. QUENELLE.
CORNELIUS F. TURNER.